United States Patent [19]

Tanii et al.

[11] Patent Number: 4,492,510
[45] Date of Patent: Jan. 8, 1985

[54] ROBOT HAND DRIVING MECHANISM

[75] Inventors: Shigetaka Tanii; Hisao Sasaki, both of Toyama, Japan

[73] Assignee: Toyama Machine Works, Ltd., Toyama, Japan

[21] Appl. No.: 465,717

[22] Filed: Feb. 11, 1983

[30] Foreign Application Priority Data

Feb. 12, 1982 [JP] Japan .................................. 57-21592

[51] Int. Cl.³ ............................................. B66C 1/00
[52] U.S. Cl. ...................................... 414/733; 901/26; 901/19
[58] Field of Search .................... 414/733; 901/20, 21, 901/19, 26, 29

[56] References Cited

U.S. PATENT DOCUMENTS 3,784,031 1/1974 Niita et al. ........................ 901/26 X
3,826,383 7/1974 Richter ................................ 414/730

Primary Examiner—Robert J. Spar
Assistant Examiner—Dennis J. Williamson
Attorney, Agent, or Firm—Sughrue, Mion, Zinn, Macpeak & Seas

[57] ABSTRACT

A mechanism for driving a robot hand mounted on a robot arm includes a pair of planetary gear assemblies coupled to motors for swinging the robot hand about a first shaft and for rotating the robot hand about a second shaft through transmission systems. During swinging motion of the robot hand about the first shaft, rotative power from the motor which causes such rotation is transmitted by the planetary gear assemblies to the second shaft also, so that rotation of the robot hand resulting from the swinging motion of the robot hand can be cancelled out.

7 Claims, 5 Drawing Figures

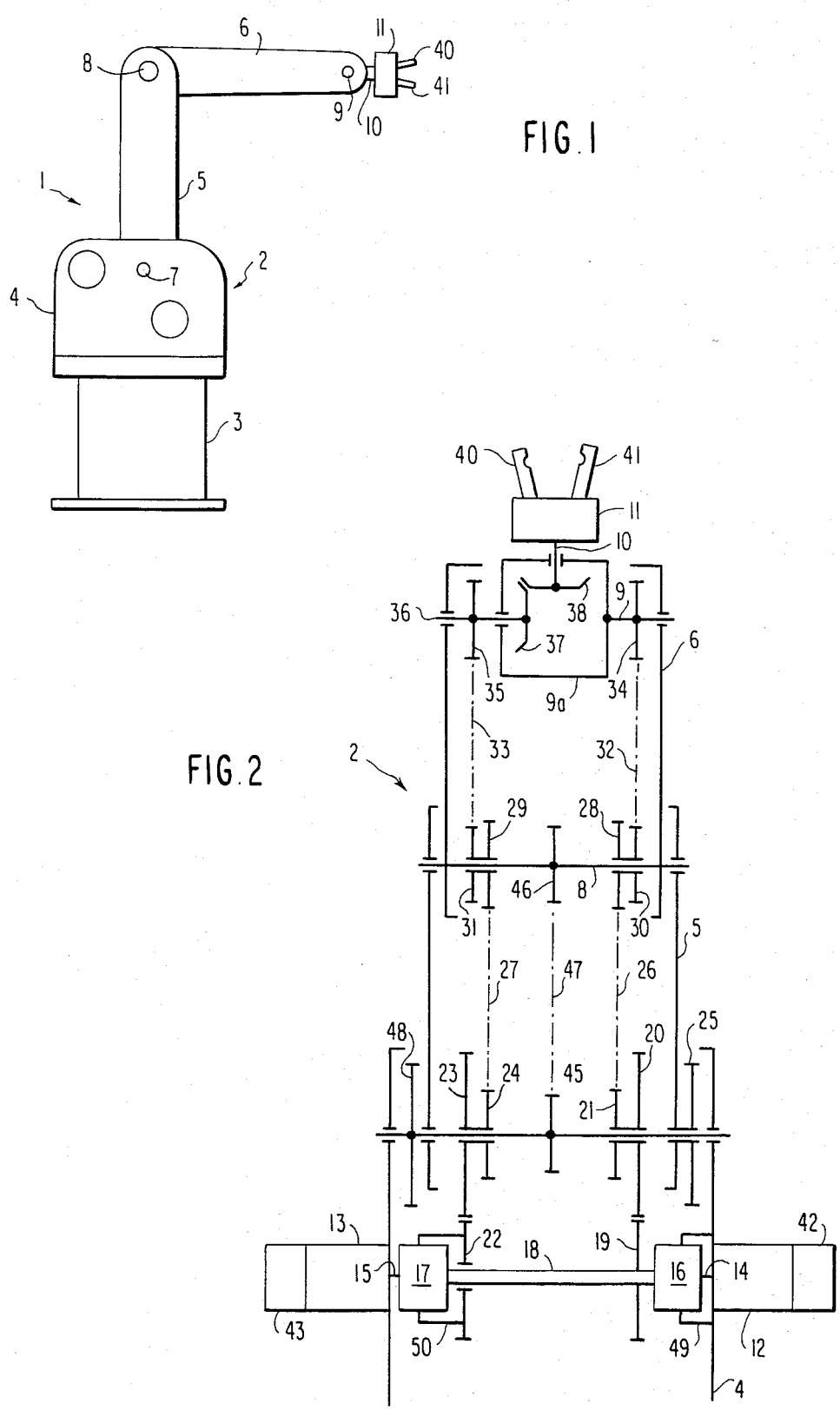

ROBOT HAND DRIVING MECHANISM

BACKGROUND OF THE INVENTION

The present invention relates to an industrial robot having articulated arms, and more particularly to a mechanism for driving a robot hand.

Industrial robots include a differential gear mechanism for swinging and rotating a robot hand in a related manner. One conventional type of industrial robot has two differential gear mechanisms incorporated in the robot hand and a robot hand driving device, respectively, so that rotation of one of the differential gear mechanisms can be reversed and transmitted to the other to cancel out unwanted rotation of the latter differential gear mechanism. Inclusion of two differential gear mechanisms however, renders the robot large in size, and results in reduced robot motive capability due to an increased inertia of the movable parts. Another way of eliminating unnecessary motion of the robot hand is by a software approach in which the motor is driven by the results of the arithmetic operations effected by a control unit of the robot. However, the control unit required for executing such a program is relatively complex.

SUMMARY OF THE INVENTION

It is an object of the present invention to provide a robot hand driving mechanism having a simplified drive and control system including planetary gear assemblies for cancelling out the unwanted rotation of a robot hand which results from a swinging motion thereof.

Another object of the present invention is to provide a robot hand driving mechanism including planetary gear mechanisms for attaining large speed reduction ratios, thus eliminating complicated gear trains which would otherwise be needed for reducing the speed of rotation of driving motors.

According to the present invention, the mechanism for driving a robot hand of an industrial robot comprises a body, a plurality of articulated arms pivotably mounted on the body, the robot hand being pivotably mounted on one of the arms, a differential gear mechanism mounted on this arm for swinging the robot hand about a first shaft and rotating the robot hand about a second shaft, the first and second shafts being rotatably mounted on the arm, a pair of first and second motors for driving the first and second shafts, respectively, a pair of first and second transmission systems for transmitting rotative power from the first and second motors respectively to the first and second shafts, a first planetary gear assembly disposed in the first transmission system and having a first internal gear fixed to the body and a first planet gear operatively connected to the first shaft, a second planetary gear assembly disposed in the second transmission system and having a second internal gear operatively connected to the second shaft and having a second planet gear, and a coupling shaft connecting the first and second planet gears to each other. Rotation of the robot hand resulting from swinging movement thereof can be cancelled out by the planetary gear assemblies.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a side elevational view of an industrial robot having articulated arms;

FIG. 2 is a schematic diagram of a robot hand driving mechanism according to the present invention;

DETAILED DESCRIPTION OF THE PREFERRED EMBODIMENTS

Figure 3:
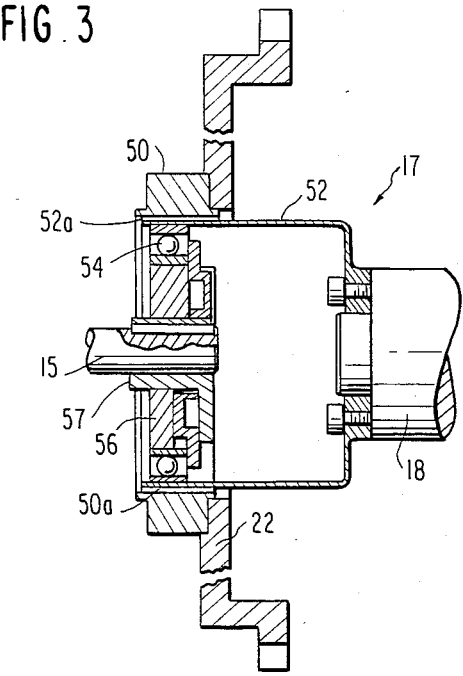
FIGS. 3 and 4 are fragmentary cross-sectional views of planetary gear systems which serve as speed reducers of the harmonic drive type.

FIG. 1 shows an industrial robot 1 having articulated arms and a robot hand driving mechanism 2 according to the present invention. The industrial robot 1 includes a robot base 3 and a robot body 4 mounted on the robot base 3 for rotation about a vertical axis. A first arm 5 is pivotably mounted by a shaft 7 on the robot body 4, and a second arm 6 is pivotably mounted by a shaft 8 on the first arm 5. A robot hand 11 is mounted on the second arm by a shaft 9 for swinging movement thereabout and by a shaft 10 for rotational movement thereabout. The robot hand 11 is thus rotatable and swingable with respect to the second arm 6.

As shown in FIG. 2, the robot hand driving mechanism 2 is incorporated in the robot body 4, the first arm 5, and the second arm 6. The robot body 4 supports on its sides a pair of motors 12, 13 for swinging and rotating the hand 11, respectively. The motors 12, 13 have motor shafts 14, 15, respectively, coupled to planetary gear assemblies 16, 17, respectively, which are mounted in the robot body 4 and interconnected by a coupling shaft 18. The structure and operation of the planetary gear assemblies 16, 17 will be described in detail later on.

A gear 19 is fixedly mounted on the coupling shaft 18 and meshes with a gear 20 affixed to a chain wheel 21 and rotatably supported on a shaft 7 which is rotatably supported on the robot body 4. The planetary gear assembly 17 has an output gear 22 which is held in driving mesh with a gear 23 and is freely rotatable with respect to the coupling shaft 18. The gear 23 is affixed to a chain wheel 24 and rotatably supported on the shaft 7. The first arm 5 has an end angularly movably supported on the shaft 7. The first arm 5 is angularly movable by a drive means (not shown) through a gear 25 secured to the first arm 5. The chain wheels 21, 24 are operatively coupled to a pair of chain wheels 28, 29, respectively, by a pair of respective chains 26, 27 which travel around the chain wheels 21, 28 and the chain wheels 24, 29, respectively. The chain wheels 28, 29 are secured to a pair of chain wheels 30, 31, respectively, and are rotatably supported on the shaft 8 which is rotatably mounted at the other end of the first arm 5. The second arm 6 has one end fixedly mounted on the shaft 8. The shafts 7, 8 support a pair of chain wheels 45, 46 affixed thereto, respectively, and are operatively coupled by a chain 47 extending therearound. A gear 48 is fixedly mounted on the shaft 7 and coupled to a drive means (not shown). Therefore, the second arm 6 is drivable by rotative power transmitted from such a drive means through the gear 48, the shaft 7, the chain wheel 45, the chain 47, the chain wheel 46, and thence through the shaft 8.

A pair of chains 32, 33 travel around the chain wheels 30, 31, respectively, and a pair of chain wheels 34, 35, respectively, which are fixed to the shaft 9 and an intermediate shaft 36, respectively. The shafts 9, 36 are rotatably supported on the second arm 6 in coaxial relation. The shaft 9 has a wrist 9a mounted in the second arm 6. The wrist 9a rotatably supports the shaft 10, which is connected to the robot hand 11. The intermediate shaft 36 is rotatably supported by the wrist 9a and is operatively coupled to the shaft 10 by a pair of meshing bevel gears 37, 38 affixed to the shafts 36, 10, respectively, the bevel gears 37, 38 having the same number of gear teeth. The chain wheels 34, 35, the wrist 9a, and the bevel gears 37, 38 jointly constitute a differential gear mechanism. A pair of encoders 42, 43 are attached to the motors 12, 13, respectively, for detecting the amount of rotation thereof.

The robot hand 11 has a pair of grip fingers 40, 41 actuatable by a finger actuator (not shown) for gripping an article therebetween.

Figure 4:
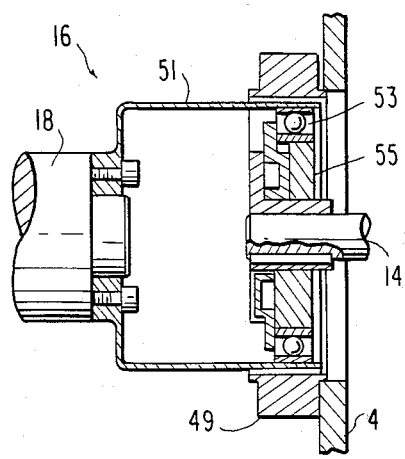

The planetary gear assemblies 16, 17 serve as speed reducers of the harmonic drive type. As illustrated in FIGS. 3 and 4, the planetary gear units 16, 17 are of the same construction, respectively comprising circular splined shafts or rings 49, 50 serving as internal gears, and flexible splined cylinders 51, 52 disposed in and held in mesh with the circular splined rings 49, 50, respectively, the flexible splined cylinders 51, 52 serving as planet gears. Oval-shaped wave generators 55, 56 are fitted in the flexible splined cylinders 51, 52, respectively, with flexible annular bearings 53, 54 therebetween. The flexible splined cylinders 51, 52 are thus held in mesh with the circular splined rings 49, 50, respectively, in two positions which correspond to the ends of a major axis of the oval-shaped wave generators 55, 56.

As shown in FIG. 3, the motor shaft 15 of the motor 13 is affixed to the wave generator 56, and the circular splined ring 50 is connected to the output gear 22. The flexible splined cylinder 52 is fastened to one end of the coupling shaft 18. As shown in FIG. 4, the motor shaft 14 of the motor 12 is affixed to the wave generator 55, and the circular splined ring 49 is connected to the robot body 4. The flexible splined cylinder 51 is fastened to the other end of the coupling shaft 18.

Figure 5:
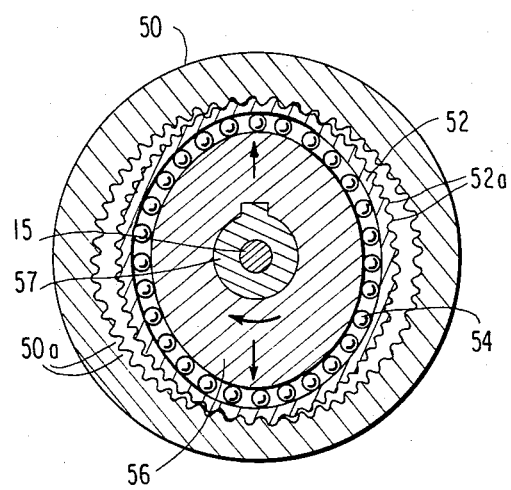
FIG. 5 is a cross-sectional view taken along line V—V of FIG. 3.

The harmonic speed reducing mechanism will now be described in greater detail with reference to FIGS. 3 and 5.

The motor shaft 15 is fixedly provided at the center of the oval-shaped wave generator 56 through a boss 57 provided around the periphery thereof. On the outer periphery of the wave generator 56, a bearing 54 is provided. The bearing 54 is movable in the radial direction as the wave generator 56 rotates. The outer periphery of the bearing 54 supports the inner periphery of the flexible splined cylinder 52. The flexible splined cylinder 52 has outer teeth 52a at its outer periphery as shown in FIG. 5, and is easily deformable as the bearing 54 moves radially because of its flexibility. The circular splined ring 50 has inner teeth 50a at its inner periphery which are adapted to meet the outer teeth 52a of the splined cylinder 52. The number of inner teeth 50a on the circular splined ring 50 is about two teeth more than that of the outer teeth 52a. Accordingly, the inner teeth 50a of the circular splined ring 50 are in meshing engagement with the outer teeth 52a of the splined cylinder 52 on the long axis but not on the short axis.

Speed reduction by such a harmonic drive mechanism will be performed as follows.

In the state where the circular splined ring 50 is stationary, when the motor 13 is energized, the motor shaft 15 is rotated together with the boss 57 and the wave generator 56. Accordingly, the bearing 54 is then caused to move in turn in the radial direction because the wave generator 56 is ovally shaped. The outer teeth 52a of the flexible splined cylinder 52 are forcibly deformed in the radial direction because of the action of the balls of the bearing 54. Accordingly, the meshing engagement of the outer teeth 52a of the flexible splined cylinder 52 with the inner teeth 50a of the circular splined ring 50 in the direction of the long axis is moved and then, as the wave generator 56 rotates one full turn, the flexible splined cylinder 52 is rotated in the reverse direction and through the difference in teeth between the outer teeth 52a and the inner teeth 50a, for example, two teeth, resulting in a reduction in speed of the coupling shaft 18.

Also, in the state where the flexible splined cylinder 52 is stationary, when the motor 13 is energized and the motor shaft 13, the boss 57 and the wave generator 56 are rotated together, the meshing engagement of the outer teeth 52a of the flexible splined cylinder 52 with the inner teeth 50a of the circular splined ring 50 in the direction of the long axis is moved and then, as the wave generator 56 rotates one full turn, the circular splined ring 50 is rotated in the same direction and through the difference in teeth between the outer teeth 52a and the inner teeth 50a, for example, two teeth, resulting in a reduction in speed of circular splined ring 50.

Furthermore, in the state where the wave generator 56 is stationary, when the flexible splined cylinder 52 is rotated, the circular splined ring 50 rotates in the same direction, but is retarded by the difference in teeth between the inner teeth 50a and the outer teeth 52a as the flexible splined cylinder 52 rotates through one turn. This results in a reduction in speed of the circular splined ring 50. That is, assuming that the number of teeth on the circular splined ring 50 is $Z_c$, the number of teeth on the flexible splined cylinder 52 is $Z_f$ and the difference in teeth therebetween is 2, when a rotary input is applied to the wave generator 56 in the state where the circular splined ring 50 is stationary, the speed reduction ratio of the flexible splined cylinder 52 is $-2/Z_f$. When the rotary input is applied to the wave generator 56 in the state where the flexible splined cylinder 52 is stationary, the speed reduction ratio of the circular splined ring 50 is $2/Z_c$. When an input is applied to the flexible splined cylinder 52 in the state where the wave generator 56 is stationary, the output speed reduction ratio of the circular splined ring 50 is $Z_f/Z_c$. Thus, the speed reduction ratios in the states where the circular splined ring 50, the flexible splined cylinder 52, and the wave generator 56 are stationary, respectively, are different from one another.

The robot hand driving mechanism thus constructed will operate as follows. When the motor 12 is energized, rotation of the motor shaft 14 is transmitted through the planetary gear unit 16, at a speed reduction ratio determined thereby, to the coupling shaft 18, which rotates in an opposite direction. The rotation of the coupling shaft 18 is transmitted through the gears 19, 20, the chain wheel 21, the chain 26, the chain wheels 28, 30, the chain 32, and the chain wheel 34 to the shaft 9. Thus, the robot hand 11 is angularly moved or swings about the shaft 9. If the intermediate shaft 36 were held at rest at this time, the bevel gear 38 would be rotated on the bevel gear 37 due to the angular movement of the wrist 9a, causing the shaft 10 to rotate the robot hand 11, a motion which would be undesirable. The robot hand driving mechanism according to the present invention, however, causes the intermediate shaft 36 to be turned about its own axis by an angular interval which is equivalent to the turning motion otherwise imparted due to rotation of the shaft 9, thereby keeping the robot hand 11 nonrotated and maintained at its initial angle while swinging about the shaft 9. More specifically, when the motor 12 is energized and the motor 13 remains de-energized, rotative power from the flexible splined cylinder 51 is transmitted through the coupling shaft 18 to the flexible splined cylinder 52, whereupon the circular splined ring 50 and the gear 22 affixed thereto are caused to rotate in the same direction as the rotation of the coupling shaft 18. The rotation of the gear 22 is transmitted through the gear 23, the chain wheel 24, the chain 27, the chain wheels 29, 31, the chain 33, and the chain wheel 35 to the intermediate shaft 36. Accordingly, when the shaft 9 is rotated, the intermediate shaft 36 is also rotated in the same direction and through the same angular interval as the shaft 9, with the result that the bevel gear 38 remains stationary with respect to the bevel gear 37, and the robot hand 11 is prevented from rotating about the shaft 10. Although the planetary gear systems 16, 17 themselves have exactly the same speed reduction ratios, the ratio of speed reduction between the motor shaft 14 and the coupling shaft 18 is different from the speed reduction ratio between the coupling shaft 18 and the gear 22 because of the different ways in which the planetary gear systems 16, 17 receive the rotative power input and produce a rotative power output. To compensate for such discrepancy between the speed reduction ratios, the gears 19, 20 have a speed reduction ratio different from that of the gears 22, 23 so that the shafts 9, 36 will turn about their own axes at the same rate of angular movement. That is, the difference in the speed reduction ratio between the gears 19, 20 and the gears 22, 23 is adapted to compensate the difference in speed reduction ratio between the state where the circular splined ring 49 is stationary and the state where the wave generator 56 is stationary.

The robot hand 11 is rotated about the shaft 10 by the motor 13. When the motor 13 is energized and the motor 12 remains de-energized, rotation of the motor shaft 15 is transmitted to the wave generator 56, from which rotative power is transmitted to the gear 22 at the speed reduction ratio of the planetary gear assembly 17. Rotation of the gear 22 is transmitted through the gear 23, the chain wheel 24, the chain 27, the chain wheels 29, 31, the chain 33, and the chain wheel 35 to the intermediate shaft 36, which then causes the bevel gears 37, 38 to rotate the shaft 10, and hence the robot hand 11, through a given angle. At this time, the shaft 9 is not adversely affected by the rotation of the intermediate shaft 36. While one of the motors 12, 13 has been described as remaining de-energized during energization of the other, they may be energized simultaneously in actual operation.

The planetary gear assemblies 16, 17, therefore, serve to reduce the speed of rotation of the motors 12, 13 at predetermined ratios, and also to transmit rotative power to both shafts 9, 10 when the motor 12 is energized, and to only the shaft 10 when the motor 13 is energized, as the coupling shaft 18 does not rotate in this instance.

While the planetary gear assemblies 16, 17 are shown as being of the harmonic drive type, they may comprise other typical planetary gear mechanisms.

With the foregoing arrangement of the invention, rotation of the robot hand 11 during a swinging movement thereof is cancelled out by utilizing a counter-rotation transmitted via the planetary gear assemblies 16, 17. No special speed reducers are necessary for the motors 12, 13 since the planetary gear assemblies 16, 17 have large speed reduction ratios for reducing the speed of rotation of the motors 12, 13. Thus, the robot hand driving mechanism and the control thereof are rendered relatively simple.

Although a certain preferred embodiment has been shown and described, it should be understood that many changes and modifications may be made therein without departing from the scope of the appended claims.

What is claimed is:

1. A mechanism for driving a robot hand of an industrial robot, comprising:
   a robot hand mounted on an arm;
   a differential gear mechanism mounted on said arm for swinging the robot hand about first shaft means and for rotating the robot hand about second shaft means, said first and second shaft means being rotatably mounted within said arm;
   first and second motors for driving said first and second shaft means, respectively;
   first and second transmission systems for transmitting rotative power from said first and second motors respectively to said first and second shaft means;
   a first planetary gear assembly disposed in said first transmission system and having a fixed first internal gear and a first planet gear operatively connected to said first shaft means;
   a second planetary gear assembly disposed in said second transmission system and having a second internal gear operatively connected to said second shaft means and having a second planet gear; and
   a coupling shaft connecting said first and second planet gears to one another, whereby a rotation of said robot hand resulting from a swinging movement thereof can be cancelled.

2. A mechanism according to claim 1, wherein said first and second motors have first and second output shafts, respectively, said first and second internal gears comprising circular splined rings, said first and second planet gears comprising flexible splined cylinders disposed in and held in mesh with said circular splined rings, respectively, said first and second planetary gear assemblies further including first and second oval-shaped wave generators fitted in said flexible splined cylinders, respectively, and coupled to said first and second output shafts of said motors, respectively.

3. A mechanism according to claim 1, wherein said first transmission system includes a first gear fixedly mounted on said coupling shaft and operatively connected to said first shaft means, said second transmission system including a second gear fixed to said second internal gear and rotatable with respect to said coupling shaft.

4. A mechanism according to claim 1, wherein said first shaft means comprises at least a differential portion rotatably supporting said robot hand.

5. A mechanism according to claim 4, wherein said second shaft means includes a first bevel gear at one end thereof, said first bevel gear meshing with a second bevel gear rotatably connected to said robot arm, said first shaft means rotatably supporting both said second shaft means and said second bevel gear.

6. A mechanism according to claim 5, wherein rotation of said first motor effects rotary motion of said differential portion, said differential portion supporting said first bevel gear such that said first bevel gear orbits about an axis while tending to rotate about its own axis due to said meshing with said second bevel gear, said second planetary gear assembly and said second transmission systems together causing a rotation of said second shaft means together with said second bevel gear such as will counter said tendency of said first bevel gear to rotate during orbital motion thereof.

7. A mechanism according to claim 3, wherein said first and second transmission systems are provided with different gear ratios so as to compensate for different reduction ratios of said first and second planetary gear assemblies owing to the manner in which said planetary gear assemblies are driven.

* * * * *